A. L. Taylor,
Rolling Pin,
№ 66,909.              Patented July 16, 1867.

Witnesses,
Theo Fnscke
W<sup>m</sup> Trewin

Inventor
Albert L Taylor
Per Munn & Co
att'ys

United States Patent Office.

ALBERT L. TAYLOR, OF SPRINGFIELD, VERMONT.

Letters Patent No. 66,909, dated July 16, 1867.

IMPROVED PASTRY-ROLLER.

*The Schedule referred to in these Letters Patent and making part of the same.*

TO ALL WHOM IT MAY CONCERN:

Be it known that I, ALBERT L. TAYLOR, of Springfield, in the county of Windsor, and State of Vermont, have invented a new and improved Pastry-Roller; and that the following description, taken in connection with the accompanying drawings hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved device for rolling pastry, and is designed to supersede the ordinary single roller now employed for that purpose.

The single roller requires to be passed over the paste or dough several times, and in different directions, in order to spread it evenly or form a sheet of even thickness throughout, whereas my improved device requires to be passed over the paste only once or twice in order to perform the work, and it may be operated with far greater facility than the ordinary single roller. In the accompanying sheet of drawings—

Figure 1:
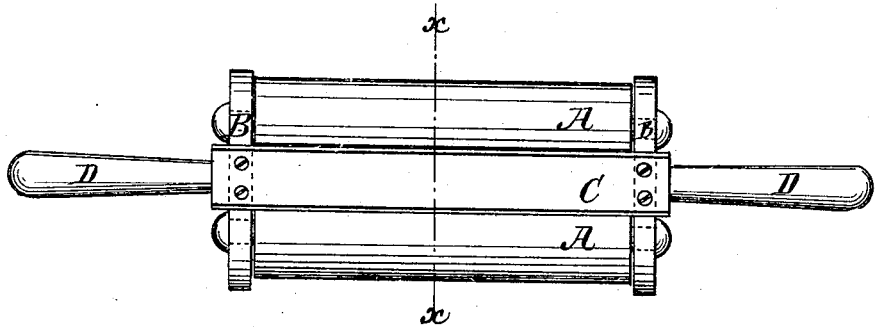

Figure 1 is a plan or top view of my invention.

Figure 2:
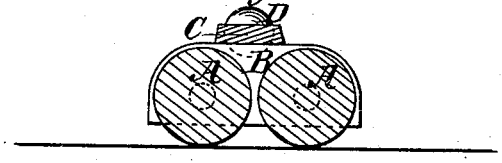

Figure 2, a transverse section of the same, taken in the line $x\,x$, fig. 1.

Similar letters of reference indicate like parts.

A A represent the rollers, turned out of any suitable hard wood, and having their journals fitted in end pieces or bearings B B, which are connected by a bar, C, parallel with the two rollers, and directly over the space between the same. On each end of the bar C a handle, D, is formed, and these handles project beyond the end pieces or bearings B B, so that they may be conveniently grasped by the hands. In using the device the handles D D are grasped by the hands, and the device shoved over the paste or dough, which is spread or rolled out thereby. The two rollers form a good bearing surface on the paste or dough, the rear roller reducing or smoothing the inequalities left by the first, and causing the paste or dough to be rolled out of a uniform thickness and with a comparatively little expenditure of time and labor. The ordinary single roller does not spread the paste or dough evenly if passed over the latter in one direction only. It is necessary to roll the paste or dough first in one direction and then in the other, in order to get it of uniform thickness throughout, and this is attended with a considerable expenditure of time and labor. My improved device can be manufactured at a trifling advance over the ordinary single roller, for although two rollers are used in my improvement they do not require to be as large in diameter. I would remark that more than two rollers may be employed, but two will answer equally as good a purpose as three or more.

Having thus described my invention, I claim as new, and desire to secure by Letters Patent—

An implement for rolling pastry, composed of a plurality of rollers fitted in suitable end pieces or bearings, or any proper stock, substantially as shown and described.

ALBERT L. TAYLOR.

Witnesses:
ASHBEL STEELE,
HENRY CLOSSON.